United States Patent [19]

Yamada et al.

[11] Patent Number: 4,662,717

[45] Date of Patent: May 5, 1987

[54] LENS AND LENS HOLDING DEVICES

[75] Inventors: Noboru Yamada; Hitoshi Minegishi, both of Hachioji, Japan

[73] Assignee: Olympus Optical Company Ltd., Japan

[21] Appl. No.: 844,214

[22] Filed: Mar. 19, 1986

Related U.S. Application Data

[63] Continuation of Ser. No. 578,198, Feb. 8, 1984, abandoned.

[30] Foreign Application Priority Data

Feb. 19, 1983 [JP] Japan ............................ 58-026792
Sep. 19, 1983 [JP] Japan ............................ 58-172635

[51] Int. Cl.⁴ .................................................... B02B 7/02
[52] U.S. Cl. ................................ 350/245; 350/252; 350/257
[58] Field of Search ............. 350/245, 252, 254, 257, 350/315, 417; 285/DIG. 22; 434/303; 220/306

[56] References Cited

U.S. PATENT DOCUMENTS

| | | | |
|---|---|---|---|
| 1,808,208 | 6/1931 | David | 350/245 |
| 2,314,838 | 3/1943 | Kingston | 350/252 |
| 2,549,541 | 4/1951 | Squiers | 350/245 |
| 2,791,454 | 5/1957 | Saives | 285/DIG. 22 |
| 3,049,613 | 8/1962 | Baldwin | 350/257 |
| 3,244,354 | 4/1966 | Bauer | 220/306 |
| 3,347,134 | 10/1967 | Nerwin | 350/252 |
| 3,409,348 | 11/1968 | Annis et al. | 350/254 |
| 3,514,188 | 5/1970 | Blosse et al. | 350/252 |
| 3,580,663 | 5/1971 | Hicks | 350/432 |
| 3,596,822 | 8/1971 | Holley | 220/306 |
| 3,645,758 | 2/1972 | MacManus | 220/306 |
| 3,873,188 | 3/1975 | Baeker | 350/417 |
| 4,046,408 | 9/1977 | Ausnit | 285/DIG. 22 |

FOREIGN PATENT DOCUMENTS

| | | | |
|---|---|---|---|
| 54-85277 | 7/1979 | Japan . | |
| .149010 | 11/1981 | Japan | 350/253 |
| 105707 | 7/1982 | Japan | 350/253 |
| 166657 | 3/1959 | Sweden | 220/306 |

*Primary Examiner*—William H. Punter
*Attorney, Agent, or Firm*—Ostrolenk, Faber, Gerb & Soffen

[57] ABSTRACT

A lens and a lens holding device make it possible to construct a compound lens or to secure a lens to a lens barrel by providing protrusions and/or depressions on a joint surface or surfaces of a lens and/or a lens contact surface of a lens barrel and interconnecting the protrusions and the depressions. Particularly, the protrusions and/or the depressions are provided with undercut areas and at least one of the protrusions and the depressions to be combined are formed so as to be elastically deformable to prevent them from separating after interconnected.

24 Claims, 26 Drawing Figures

F I G. 12
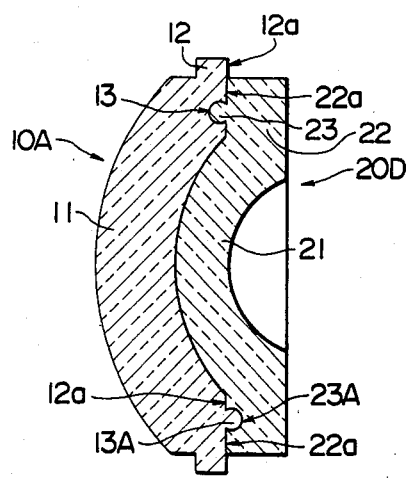
F I G. 13
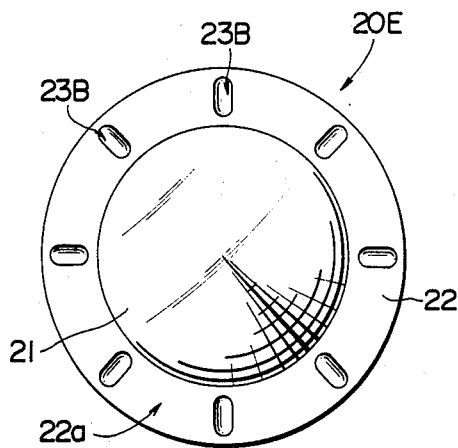
F I G. 14
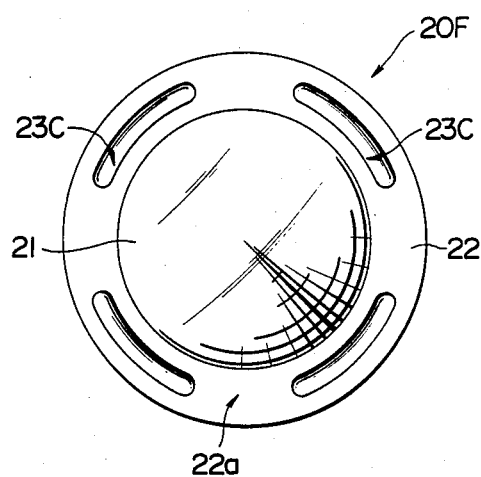
F I G. 15
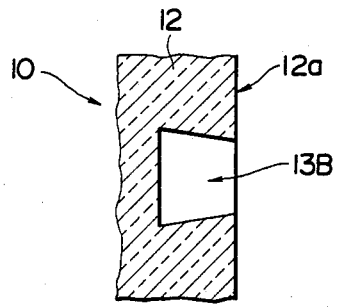
F I G. 16
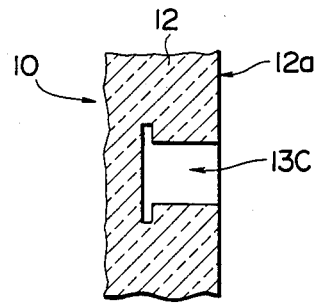

LENS AND LENS HOLDING DEVICES

This application is a continuation of application Ser. No. 578,198 filed Feb. 8, 1984, now abandoned.

BACKGROUND OF THE INVENTION

The present invention relates to a lens and a lens holding device, and more particularly, to a lens provided with a connector on its joint surface and a lens holding device for securing a lens or lenses to a lens barrel.

Compound lenes in which two or more separate pieces of single lenses are cemented together are well known. FIG. 1 illustrates an example of a conventional lens of this type. Specifically, the compound lens is constructed in such a manner that a lens 1 which has a convex surface 1a of a radius of curvature of $r_1$ and a concave surface 1b of a radius of curvature of $r_2$, as shown in FIG. 2A, and another lens 2 which has a convex surface 2a of a radius of curvature $r_3$ ($r_2 = r_3$) and a convex surface 2b of a radius of curvature of $r_4$ are cemented together through a cement layer 3 on the concave surface 1b and the convex surface 2a.

There is no problem in conventional lenses of the type when both component lenses 1, 2 to be cemented are made of glass. However, such lens has the following disadvantages when one or both of lenses 1, 2 are made of plastic.

When a glass lens and a plastic lens are cemented, for example, lens 1 being made of glass and lens 2 being made of plastic, through a cement layer 3, the cement layer 3 will shrink as it solidifies with the result that the convex surface 2a may be deformed resulting in a change of its radius of curvature $r_3$, the occurrence of wrinkles or undulation, or the like. Accordingly, the compound lens may not achieve the expected performance and there is the possibility that it will be unsuitable for use. In addition, even if the deformation resulting from the cementing operation is allowable from the viewpoint of design, other problems may result during use of the lens a compound lens is exposed to a changes in temperature and/or humidity during use with the result that the cement layer 3 may be exfoliated or the convex surface 2a of lens 2 may be deformed to a greater degree (e.g., more than ten times) than when the lens is initially cemented together. This will prevent effective use of the lens during practical application. Also, since the material of lens 2 is plastic, it is acted upon by a cement causing the convex surface 2a to be deformed, causing a failure to achieve the desired function.

Similar disadvantages may also occur when the lens 1 is made of plastic and the lens 2 is made of glass.

When both lenses 1, 2 to be cemented through the cement layer 3 are made of plastic, the concave surface 1b and the convex surface 2a is acted upon by the cement, with the resulting that the function as the lens may not be fulfilled. Even when a cementing agent which does not act upon the plastic material of the lenses 1, 2 is used, the lenses are subject to a change in their configurations (mainly the radius of curvature) during the cementing operation. since both lenses 1, 2 should be cemented applying a pressure force in the direction of the optical axis. At this time, the cement layer 3 solidifies in this deformed state with the result that it is difficult to maintain the designed radii of curvature of the lenses. Furthermore, if the cement layer 3 does not solidify uniformly, large astigmatism will be created in the compound lens and this is a big problem in aberration of a lens. In addition, as in the case where lenses of glass and plastic are cemented, when the compound lens made entirely of plastic is subject to a change of temperature and/or humidity during practical use, exfoliation or a change in configuration of the lens is created and thus it is difficult to maintain expected performance of the lens.

There has also been widely used a lens holding device employing a retainer ring for fitting a lens within a lens barrel. In FIG. 3, which illustrates an example of a conventional lens holding device, a lens fitting portion 4a in the shape of a ring abuts the inner cylindrical wall of a lens barrel 4 and a female screw threads 4b are provided on the inner wall surface rearwardly of the lens fitting portion 4a (the right side in FIG. 3, the same applies to the following description) so that a retainer ring 6 which has male threads 6a on the outer circumferential surface can be detachably engaged with the female screw threads 4b. In this lens holding device, a lens 5 is inserted into the lens barrel 4 and after the outer periphery 5a of lens 5 abuts against a shoulder surface 4c of the lens fitting portion 4a, the retainer ring 6 is threaded into the barrel 4. Subsequently, the lens 5 is restrained against the shoulder surface 4c by the retainer ring 6 and thus is fixed within the barrel 4.

However, in the conventional lens holding device employing the retainer ring 6, the lens 5 is fixed by the tightening force of the retainer ring 6 so that distortion may be caused in the lens 5 or the holding effect of the lens 5 becomes unreliable due to a change in the lens 5 with the lapse of time. In addition, when the lens 5 is made of plastic, the lens 5 may be damaged by the retainer ring 6 and the lens barrel 4 at its surface abutting thereagainst.

SUMMARY OF THE INVENTION

It is an object of the invention to provide a compound lens in which joint protrusions and joint depressions are provided on first and second lenses in opposing relationship with each other and both lenses are joined by fitting these protrusions into these depressions.

It is another object of the invention to provide a lens holding device in which joint protrusions and joint depressions are provided on a lens barrel and a lens in opposing relationship with each other and the lens is fixed to the lens barrel by fitting the protrusions into the depressions.

It is a further object of the invention to provide a single lens suitable for use in the compound lens or the lens holding device which is provided with joint protrusions and/or joint depressions.

According to the invention, a plurality of lenses can be joined by fitting protrusions and/or depressions of each lens into corresponding protrusions and/or depressions of another lens to thus form a compound lens without the and thus a compound lens is formed without the use of cementing agents. Accordingly, even in the case of compound lenses composed of a plurality of plastic lenses or compound lenses in combination of glass lenses and plastic lenses, it is possible to increase the freedom of design of lenses and to prevent deterioration of performance during joining and after the lapse of time without causing the disadvantages as in the case where a conventional method of cementing is employed.

In addition, according to the invention, a lens can be fixed to a lens barrel by fitting protrusion and/or depressions of the lens into corresponding protrusions and/or depressions of the lens barrel to fix the lens to the lens barrel without employing a retrainer ring. As a result, it is possible to hold a lens by a simple operation without causing distortion in the lens or damaging it and there is no possibility that the holding effect of the lens becomes unreliable due to a change in the lens with the lapse of time.

Further, according to the invention, a single lens is provided with protrusions and/or depressions so that the lens can be used to form a compound lens with a similarly constructed lens to be receivable within a lens barrel having appropriate protrusions and/or depressions.

Still further, it is readily practicable to join two lenses separated from each other through a connecting portion thereof or three or more lenses so that the formation of a compound lens and the construction of a lens barrel in a lens holding device can be simplified.

BRIEF DESCRIPTION OF THE DRAWINGS

FIG. 12 is a section view of a compound lens according to a still further embodiment of the invention;

FIGS. 13 and 14 are front views illustrating respective examples of aspects forming the joint depressions on the lens shown in FIG. 6B;

FIGS. 15 and 16 are partially enlarged section views illustrating respective other examples of the joint depressions shown in FIG. 7A;

DESCRIPTION OF THE PREFERRED EMBODIMENTS

Figure 5A:
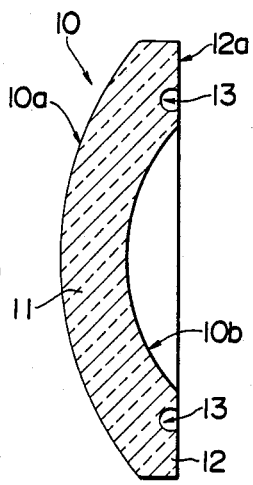
FIGS. 5A and B are section views illustrating respective component lenses forming the compound lens shown in FIG. 4.
Figure 5B:
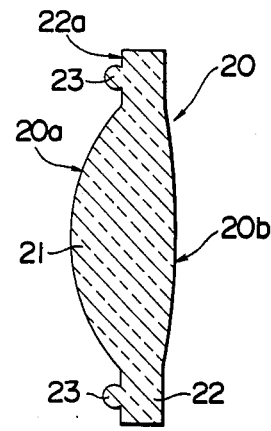
Figure 6A:
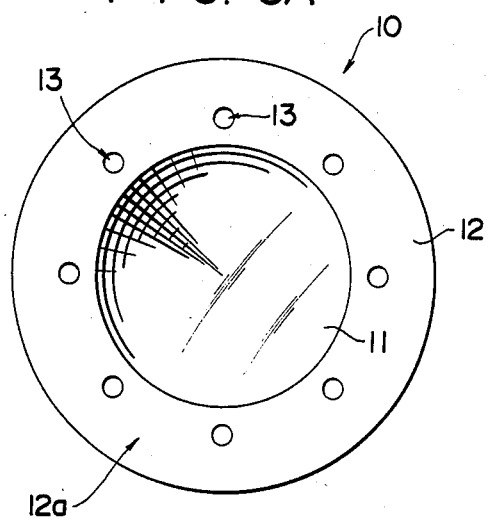
FIGS. 6A and B are a rear elevation and a front elevation of respective lenses shown in FIGS. 5A and B.
Figure 6B:
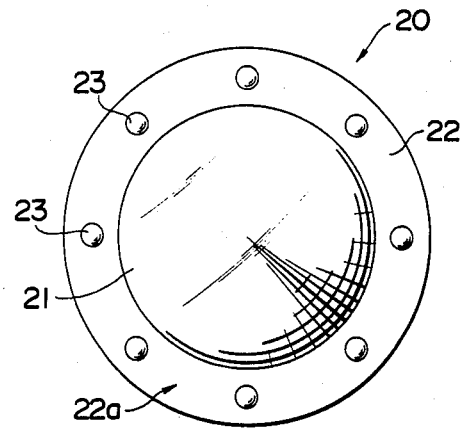
Figure 7A:
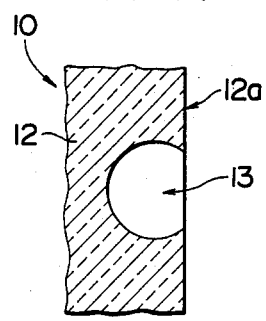
FIGS. 7A and B are partially enlarged section views of joint depression and joint protrusions provided on respective lenses shown in FIGS. 5A and B.
Figure 7B:
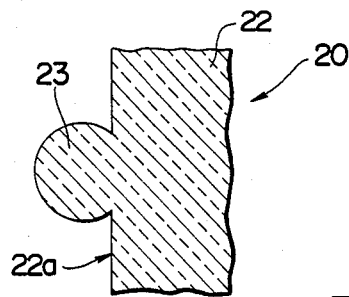

A first embodiment of the invention will now be described with reference to FIG. 4. As shown therein, a compound lens of the present invention includes a lens •10 having a convex surface 10a and a concave surface 10b (see FIG. 5A) and another lens 20 having a convex surfaces 20a, 20b (see FIG. 5B). Lenses 10, 20 are joined with the concave surface 10b and the convex surface 20a, whose radius of curvature are equal in absolute value, brought into contact in opposing relationship. The lenses 10, 20 are integrally provided with lens holding portions 12, 22 around lens bodies 11, 21. The rear and the front end planes of the holding portions 12, 22 form joint planes 12a, 22a perpendicular to the optical axis of the lenses. A plurality of joint depressions 13 (see FIG. 6A) and joint protrusions 23 (see FIG. 6B) which are extended in the direction of the optical axis are provided on the joint planes 12a, 22a in opposing relationship with each other and equidistantly in the circumferential direction. The depressions 13 are formed, as shown in FIG. 7A, as a hole in an over-hemispherical form and the diameter of their opening is smaller than the maximum inner diameter of the depression 13. The area of the lens holding portion 12 in the vicinity of the opening of the depression 13 is referred hereinafter to the undercut area. In addition, the protrusions 23 are formed, as shown in FIG. 7B, with projections of the same shape and size as the depressions 13 and the diameter of their roots is smaller than the maximum diameter of the protrusions 23. The area in the vicinity of the protrusions 23 is similarly referred hereinafter to the undercut area.

When either or both of the lenses 10, 20 are formed with an elastically deformable material such as plastic and the protrusions 23 are pushed into the depressions 13, a part of the protrusion 123 and/or the depression 13 is elastically deformed to allow the protrusion 23 to enter into the depression 13 and then is restored to its original shape, thus the protrusion 23 and the depression 13 being brought into close fitting relationship. In this condition, the undercut areas of the protrusions 23 and the depressions 13 engage with each other to prevent them from parting.

To construct the compound lens of the embodiment in which the lenses 10, 20 formed as just described above are joined, the concave surface 10b and the convex surface 20a are placed in opposing relationship under the condition where optical axes of both lenses 10, 20 are coincident so as to bring the depressions 13 and the protrusions 23 into opposing relationship. Subsequently, a compression force is applied to both lenses 10, 20 in the direction of their optical axis. Whereupon, as described above, the depressions 13 and the protrusions 23 are fitted together, so that the concave surface 10b and the convex surface 20a as well as the joint surfaces 12a, 22a are joined in opposing positions. Thus, both lenses 10, 20 are integrated to construct the compound lens. Even after the force in the direction of the optical axis is removed, the fitting condition between the depressions 13 and the protrusions 23 is maintained by the action between the undercut areas thereof and therefore there is no possibility that the compound lens thus joined is easily separated into lenses 10, 20.

Figure 8:
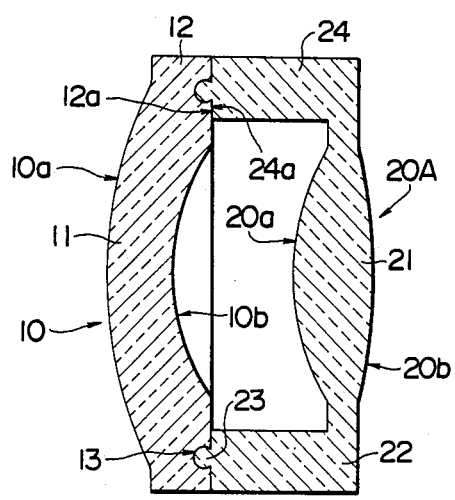
FIG. 8 is a section view of a compound lens according to another embodiment of the invention.

FIG. 8 illustrates a compound lens according to a second embodiment of the invention. The composite lens includes a lens 10 and another lens 20A which has a connecting portion 24 which is integrally provided on the lens 20 of the first embodiment shown in FIG. 14 and is constructed connecting both lenses 10, 20A through the connecting portion 24 with their lens bodies 11, 21 separated. The connecting portion 24 is of a short cylindrical form extending from the front surface of the lens holding portion 22 in the direction of the optical axis and the joint protrusions 23 are provided on a joint surface 24a which is the front end surface of the connecting portion 24.

Figure 1:
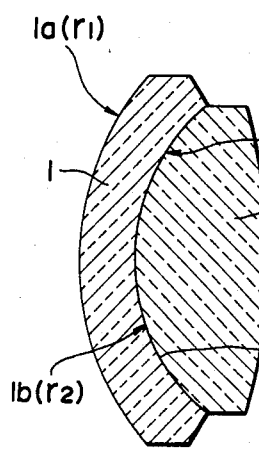
FIG. 1 is a section view illustrating an example of conventional compound lenses.
Figure 2A:
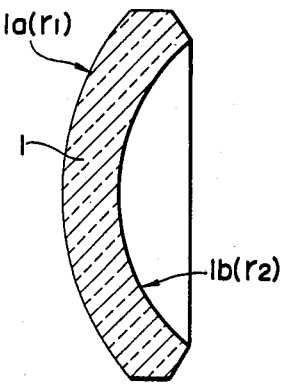
FIGS. 2A and B are section views illustrating each of component lenses forming the compound lens shown in FIG. 1.
Figure 2B:
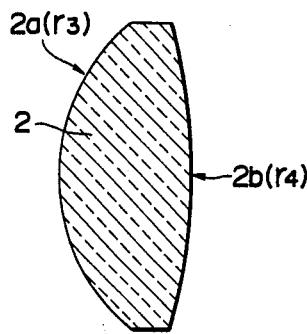
Figure 3:
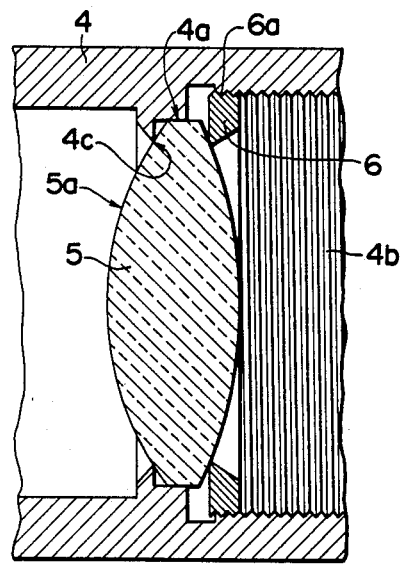
FIG. 3 is a section view illustrating an example of conventional lens holding devices.
Figure 4:
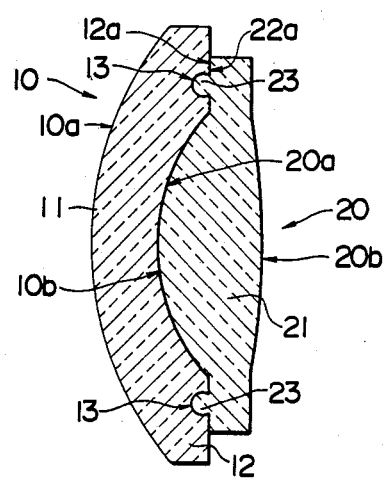
FIG. 4 is a section view of a compound lens according to an embodiment of the invention.

In the second embodiment, as in the case of the first embodiment shown in FIG. 4, both lenses 10, 20A are integrated by placing the depressions 13 and the protrusions 23 in a mating condition and thus the compound lens is constructed through the connecting portion 24 with their lens bodies 11, 21 separated by a given distance.

It is to be understood that the connecting portion 24 does not have to be in a short cylindrical form but may be formed, for example, with a plurality of connecting arms. In addition, since the lens bodies 11, 21 in the second embodiment do not come into direct contact, the radius of curvature of the concave surface 10b of the lens 10 and the radius of curvature of the convex surface 20a of the lens 20A are not necessarily equal.

Figure 9:
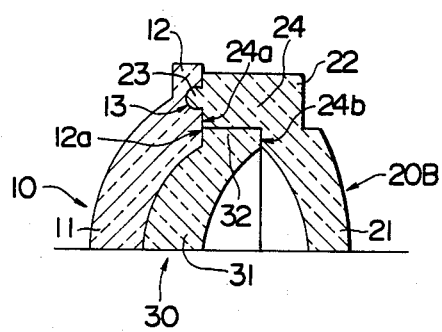
FIGS. 9 and 10 are upper half section views according to a further embodiments of the invention.

FIG. 9 illustrates a compound lens of a third embodiment of the invention. The compound lens is constructed by holding a third lens 30 between two lenses 10, 20B which are joined, in a manner similar to the second embodiment shown in FIG. 8, through connecting portion 24. Specifically, the compound lens is provided with a step portion 24b on the inner peripheral surface of the connecting portion 24 of the lens 20B which is integrated with the lens 10 by the depressions 13 and the protrusions 23. A lens supporting portion 32 which is provided on the circumference of a lens body 31 of the lens 30 is closely fitted between the step portion 24b and the joint surface 12a of the lens 10 to support the lens 30 between both lenses 10, 20B. In this case, the convex surface of the lens 30 is fitted into the concave surface of the lens 10.

In the third embodiment, while lenses 10, 20B are united by placing the depressions 13 and the protrusions 23 in a mating condition, the lens 30 is placed between lenses 10, 20B with the result that the compound lens is composed of three lenses.

Figure 10:
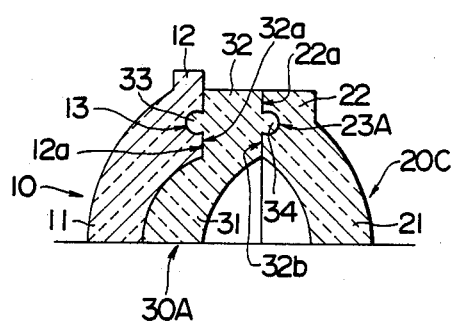

FIG. 10 illustrates a compound lens according to a fourth embodiment of the invention. The compound lens of this embodiment is, like the third embodiment shown in FIG. 9, composed of three lenses. Joint protrusions 33, 34 are provided on joint surfaces 32a, 32b which are the front and rear end surfaces, respectively of lens holding portion 32 of an intermediate lens 30A. Joint depressions 13, 23A are provided on a joint surface 12a of a front lens 10 and a joint surface 22a of a rear lens 20C, respectively.

In the fourth embodiment, lenses 10, 30A are united by fitting protrusions 33 into depressions 13 and lenses 30A, 20C are united by fitting protrusions 34 into depressions 23A. As a result, three lenses 10, 30A, 20C are united to form the compound lens composed of three lenses.

A compound lens composed of four lenses can be constructed, according to the present invention, by providing a first series of depressions or protrusions on joint surfaces which are formed by front or rear end surfaces of the compound lens of the third and the fourth embodiments and placing a second series of protrusions or depressions which are provided on a fourth lens and the first series of depressions or protrusions in a mating condition. It will be understood that a compound lens composed of any number of lenses can be readily constructed in a manner similar to that described above (the same applies to the following embodiments).

Figure 11:
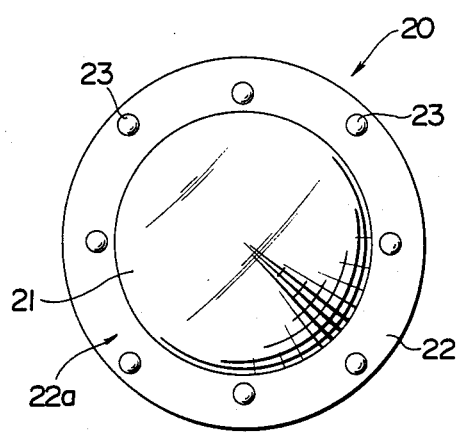
FIG. 11 is a front view illustrating an example of another aspects forming the point protrusions on the lens shown in FIG. 6B.

In the above mentioned embodiments, all of joint depressions 13, 23A and joint protrusions 23, 33, 34 are positioned on the same circumference whose center is the optical axis. It is to be understood, however, that the depressions and the protrusions can be arranged in any positions such as the protrusions 23 of lens 20, for example, which ar alternately. arranged on different circumferences as shown in FIG. 11 (the same applies to the following embodiments).

Furthermore, while both lenses 10, 20 in the foregoing description are provided with the depressions 13 and the protrusions 23, respectively, it will be understood that lenses providing the depressions and the protrusions can be reversed (the same applies to the following embodiments).

FIG. 12 illustrates a compound lens according to a fifth embodiment of the invention. The compound lens includes a lens 10A in which depressions 13 and protrusions 13A are alternately provided on a joint surface 12a thereof and another lens 20D in which protrusions 23 and depressions 23A are alternately provided on a joint surface 22a thereof in opposing to those in the joint surface 12a and is constructed by fitting the protrusions 23, 13A into depressions 13, 23A respectively to integrate both lenses 10A, 20D.

According to the compound lens of the fifth embodiment, lenses 10A, 20D can be joined by operations similar to those of the above mentioned embodiments and particularly it is possible to advantageously and reliably integrate both lenses 10A, 20D even when there is a large difference in size therebetween, since the depressions and the protrusions on the joint surfaces are alternately arranged in opposing relationship with each other.

FIG. 13 illustrates one of lenses 20E to form a compound lens according to an additional embodiment of the invention. The lens 20E is provided with a plurality of joint depressions 23B which are of grooves whose length extends in the radial direction of the lens equidistantly on the circumference of the lens 20E. While not shown, another lens to be joined with the lens 20E is provided with joint protrusions which will mate with the depressions 23B. The shape of the section of the depressions 23B taken along the direction perpendicular to the direction of the length of the depression 23B are the same as shown in FIG. 7A. and Similarly, the shape of the section of the mating protrusions taken along the direction perpendicular to the direction of the length of the protrusion is the same as shown in FIG. 7B. When fitted, the protrusions and the depressions 23B act to prevent both lens from separating with the undercut areas.

FIG. 14 illustrates one of lenses 20F to form a compound lens according to yet an additional embodiment of the invention. The lens 20F is provided with a plurality of joint depressions 23C which are of grooves lengthened in the circumferential direction and which are located equidistantly on a joint surface 22a of the lens 20F. While not shown, the lens to be joined with the lens 20F is provided with joint protrusions which will mate with the depressions 23C. The shape of sections taken along a direction perpendicular to the longitudinal direction of the depressions 23C and the mating protrusions (not shown) are also the same as shown in FIGS. 7A and B. When fitted, the depressions 23C and the protrusions act to prevent both lenses from separating with the undercut areas.

FIGS. 15 and 16 illustrate variations on the depression 13 shown in FIG. 7A. A depression 13B shown in FIG. 15 is of a trapezoid form in section, the opening of which is smaller in diameter than the maximum inner diameter thereof. A depression 13C shown in FIG. 16 is of a form T placed sideways in section, the opening of which is smaller in diameter than the maximum inner diameter thereof. Joint protrusions to be fitted into these depressions 13B, 13C naturally assume the form corresponding thereto.

Since with the depressions 13B, 13C and the protrusions thus formed, the effect preventing both lenses from separating can be obtained, the same action and effect as in the case of depressions 13 and protrucions 23 shown in FIGS. 7A and B can be also obtained (the same applies to the following embodiments).

Figure 17:
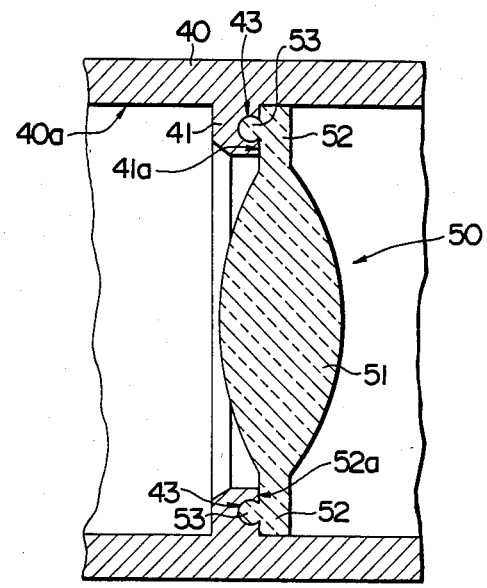
FIG. 17 is a section view of a lens holding device illustrating an example of the invention.

FIG. 17 illustrates a lens holding device according to one example of the invention. The lens holding device includes a cylindrical lens barrel 40 which is provided with a ring shaped lens contact portion 41 in on the inner circumferential surface 40a of the lens barrel 40. Joint depressions 43 are provided on a vertical contact surface 41a of the rear end of the contact portion 41. The lens 50 can be secured to the lens barrel 40 by fitting joint protrusion 53 which is provided on a joint surface 52a of the lens 50 into the depressions 43.

The depressions 43 are formed in an over-hemisphere shape, in a manner similar to the depressions 13 shown in FIG. 7A, to have the undercut area. The lens 50 is provided with a lens holding portion 52 on the periphery thereof and joint protrusions 53 extending in the direction of the optical axis of the lens are provided on a joint surface 52a which is perpendicular to the optical axis and is the front end surface of the lens holding portion 52. The protrusions 53 are formed to be in the same shape and the same size as the depressions 43 in a manner similar to the protrusions 23 shown in FIG. 7B. At least one of the lens barrel 40 and the lens 50 is formed of an elastic material such as plastic. When a force is applied so as to thrust the protrusions 53 into the depressions 43, the protrusions 53 and/or the depressions 43 deform elastically and temporarily so that the protrusions 53 enter into the depressions 43 resulting in that both are closely fitted each other. Under such condition, the lens 50 and lens barrel 40 are prevented from separating due to the mating of their undercut areas. Also, it will be understood that the other diameter of the lens 50 is somewhat smaller than the inner diameter of the lens barrel 40.

In the lens holding device of the present embodiment of the invention, to secure the lens 50 to the lens barrel 40, first, the lens 50 is inserted into the lens barrel 40 from the opening at the side opposite the contact surface 41a of the lens barrel 40 and is pushed to place the depressions 43 and the protrusions 53 in opposing relationship with each other than the protrusions 53 fit into the depressions and the lens 50 is held within lens barrel 40 under the condition where the contact surface 41a closely abut against the joint surface 42A of the lens 50A.

Figure 18:
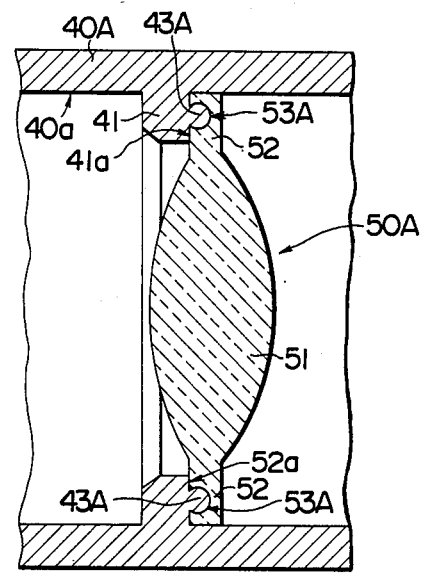
FIGS. 18 and 19 are section views of respective lens holding devices illustrating other examples of the invention.

A lens holding device in FIG. 18 is a second embodiment of the invention, in which materials to form the protrusions 53 and the depressions 43 in the lens holding device of the first embodiment shown in FIG. 17 are reversed. Specifically, joint protrusions 43A are provided on a contact surface 41a of a lens barrel 40A and joint depressions 53A are provided on a joint surface 52a of a lens 50A. The lens 50A is held within the lens barrel 40A by fitting the protrusions 43A into the depressions 53A.

It will be understood that the same action and effect as the device of the first embodiment shown in FIG. 17 can be obtained also in the lens holding device of the second embodiment.

Figure 19:
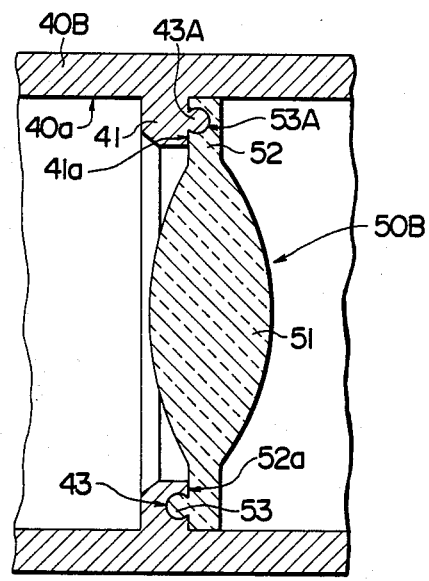

A lens holding device in FIG. 19 is a third embodiment of the invention in which first series of protrusions 43A and depressions 43 are alternately provided on a contact surface 41A of a lens barrel 40B and a second series of depressions 53A and protrusions 53 are alternately provided on a joint surface 52a of a lens 50B in opposing relationship with the first series of depressions and protrusions. Then the protrusions 43A are fitted into the depressions 53A and the protrusions 53 are fitted into the depressions, whereby the lens 50B is held within the lens barrel 40B.

It will be noted that even when depressions and protrusions are alternately arranged as in the lens holding device of the above embodiment or are arranged in any other arrangement, the same supporting action and effect as in the device of the embodiment shown in FIGS. 17 and 18 can be obtained.

Figure 20:
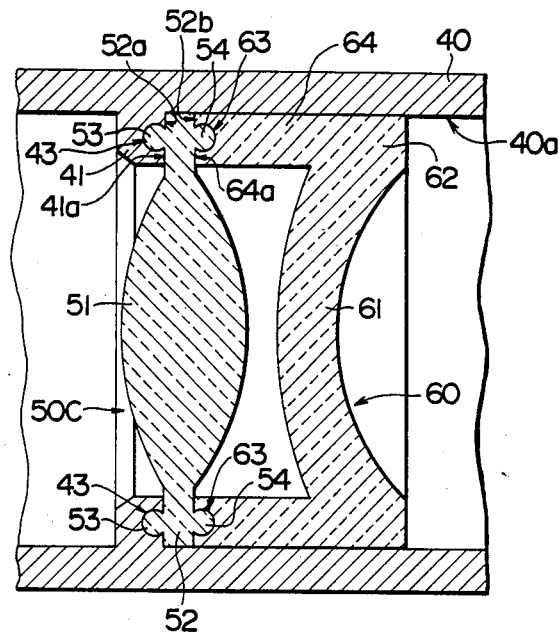
FIG. 20 is a section view of a lens holding device illustrating a further embodiment of the invention.

A lens holding device in FIG. 20, which is a fourth embodiment of the invention, includes a lens 50C constructed in such a manner that the lens 50 of the lens holding device of the first embodiment shown in FIG. 17 is further provided with a joint surface 52b at the rear end surface of the lens holding portion 52 of the lens 50 and joint protrusions 54 are provided in the direction of the optical axis on the joint surface 52b. By fitting protrusions 54 into depressions 63 which are provided on a lens 60, both lenses 50C, 60 are held within the lens barrel 40. The lens 60 is provided with a cylindrical connecting portion 64 formed fowardly of a lens holding portion 62 around a lens body 61.

Depressions 63 are provided on a joint surface 64a which is the front end surface of the connecting portion 64 so as to oppose to protrusions 54 provided on the lens 50C. The outer diameter of the lens 60 is somewhat smaller than the inner diameter of the lens barrel 40 so that the lens 60 can be inserted into the lens barrel 40. It will be understood that one or both of the lenses 50C, 60 are formed of elastic material such as plastic so that after the protrusions 54 are fitted into the depressions 63, both can be prevented from separating by the action of the undercut areas thereof.

In the lens holding device of the fourth embodiment of the invention, to secure the lenses 50C, 60 to the lens barrel 40, first, the lens 50C is inserted into the lens barrel 40 and the depressions 53 are fitted into the depressions 43 to hold the lens C within the lens barrel 40. Next, the lens 60 is inserted from the connecting portion 64 through the same opening as when the lens 50C has been inserted into the lens barrel 40 and the protrusions 54 are fitted into the depressions 63. Then the lens 60 is secured through the lens 50C to the lens barrel 40 and simultaneously is secured to the lens 50C with the result that a compound lens is constructed. As such, the lens holding device has the advantages that the fitting of lenses into the lens barrel and the formation of the compound lens are achieved simultaneously. It will be understood that after the compound lens is constructed joining the lenses 50C, 60, it may be fitted into the lens barrel 40 by inserting it into the lens barrel 40 (the same applies to the following embodiments).

Figure 21:
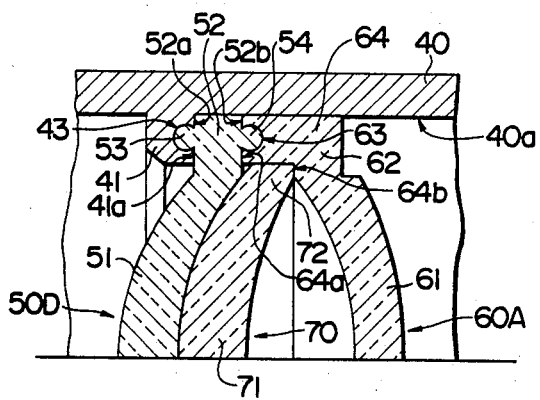
FIGS. 21 and 22 are upper half section views of respective lens holding devices illustrating still further embodiments of the invention.

A lens holding device in FIG. 21, which is a fifth embodiment of the invention, is constructed, in a manner similar to the device of the fourth embodiment of the invention, by holding a third lens 70 between two lenses 50D, 60A which are joined through a connecting portion 64 utilizing the joint force between lenses 50D, 60A. Specifically, in the lens holding device, both lenses 50D, 60A are integrated through the connecting portion 64 by fitting the protrusions 54 into the depressions 63 and a lens holding portion 72 of the third lens 70 is closely fitted between a step portion 64b which is provided on the inner circumferential surface of the connecting portion 64 and a joint surface 52b of the lens 50D. The lens holding portion 72 is formed on the periphery of a lens body 71 of the lens 70 and a front convex surface of the lens body 71 is fitted into a rear concave surface of the lens 50D.

In the lens holding device, after the lens 50D is inserted into the lens barrel 40 to fit the protrusions 53 into the depressions 43 and thus the lens 50D is secured to the lens barrel 40, the lens 70 is inserted and further the lens 60A is inserted to fit the protrusions 54 into the depressions 63 and thus the lens 60A is secured to the lens 50D. Then the lens 60A is secured through the lens 50D to the lens barrel 40 and the lens 70 is also secured between lenses 50D, 60A. As a result, three lenses 50D, 70, 60A are secured to the lens barrel 40 and at the same time the compound lens composed of three lenses is formed within the lens barrel 40.

Figure 22:
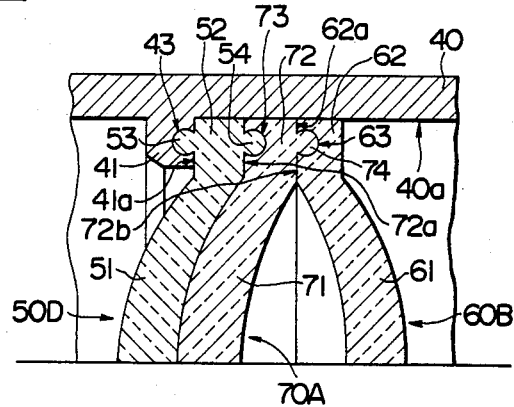

A lens holding device in FIG. 22, which is a sixth embodiment of the invention, holds a compound lens composed of three lenses in a manner similar to the device of the fifth embodiment shown in FIG. 21. The lens barrel 40 and the lens 50D which is directly secured to the lens barrel 40 are formed in a manner similar to the device shown in FIG. 21. Depressions 73 and protrusions 74 are provided on joint surfaces 72a and 72b which are the front and the rear end surface of a lens holding portion 72 of a lens 70A which is disposed between lenses 50D, 60B, respectively. The lens 70A is secured through the lens 50D to the lens barrel 40 by fitting the protrusions 54 of the lens 50D into the depressions 73. The lens 60B which is disposed in the rear side is provided with depressions 63 on a joint surface 62a which is the front end surface of a lens holding portion 62 of the lens 60B. The lens 60B is secured through lenses 50D, 70A by fitting the protrusions 74 of the lens 70A into the depressions 63 of the lens 60B.

In the lens holding device of the sixth embodiment, lenses 50D, 70A and 60B are successively inserted into the lens barrel 40 and the depressions 43 and the protrusions 53, the protrusions 54 and the depressions 73, and the protrusions 74 and the depressions 63 are successively fitted each other. Thus, lenses 50D, 70A and 60B are secured to the lens barrel 40 and a compound lens composed of three lenses is formed.

It will be understood that while each lens in the above mentioned embodiments consists of a normal spherical lens having a convex surface, and/or a concave surface an aspherical lens could also be used.

Furthermore, a lens body, a lens holding portion and joint protrusions and/or joint depressions of one lens in each of the above embodiments are formed in a body with material such as plastics or glass. It is to be noted, however, that a lens body and a lens holding portion, protrusions and/or depressions, for example, may be formed with different materials employing a method such as a dichromatic formation of plastics or the like, respectively.

What is claimed is:

1. A lens holding device, comprising:
a lens barrel having a lens joint surface, a first set of protrusions and/or depressions being located on said lens joint surface; and
a first lens having an optical axis along a given direction and having a first joint surface, a second set of protrusions and/or depressions being located on said first joint surface;
said first set of protrusions and/or depressions being matingly engaged with said second set of protrusions and/or depressions in such a manner that said lens is snappingly secured to said lens barrel against moving along or rotating about said optical axis by the interaction of said first and second set of protrusions and/or depressions, said first lens having a second joint surface on which a third set of protrusions and/or depressions are provided on said second joint surface, and wherein said lens holding device further comprises a second lens having a third joint surface, a fourth set of depressions and/or protrusions being located on said third joint surface, said fourth set of protrusions and/or depressions being matingly engaged with said third set of protrusions and/or depressions in such a manner that said second lens is secured to said first lens and therefore to said lens barrel, said first and second lenses cooperating to form a compound lens.

2. A lens holding device according to claim 1, in which said second lens has a connection portion which extends in the direction of the optical axis of said first and second lenses from a lens holding portion which is provided around the body of said second lens and wherein said third joint surface of said lens is defined by a front end surface of said connection portion.

3. A lens holding device according to claim 2, further including a third lens, which is arranged so that a lens holding portion which is provided around the body of the third lens is held between said first and second lenses by the joining force of said third and fourth sets of protrusions and/or depressions.

4. A compound lens, comprising:
a first lens having a first joint surface, a first set of protrusions and/or depressions being located on said first joint surface; and
a second lens having a second joint surface, a second set of protrusions and/or depressions being located on said second joint surface;
said first set of protrusions and/or depressions being matingly connected to said second set of protrusions and/or depressions in such a manner that said first and second lenses are held together by the interaction of said first and second set of protrusions and/or depressions to form said compound lens.

5. A compound lens according to claim 4, in which said joint surfaces are defined by planes which are located perpendicular to the optical axis of said first and second lenses, and said protrusions and/or depressions are formed in the general direction of the optical axis.

6. A compound lens according to claim 4, in which said protrusions and/or depressions include undercut areas which require said first set of protrusions and/or depressions to be snapped into mating engagement with said second set of protrusions and/or depressions and wherein at least one of said first and second sets of protrusions and/or depressions are formed of an elastically deformable material.

7. A compound lens according to claim 6, in which each of said protrusions and/or depressions are arranged equidistantly on the same circumference whose center is the optical axis of said first and second lenses.

8. A compound lens according to claim 6, in which each of said protrusions and/or depressions of said first set are alternatively located on first and second circumferences of said first lens and each of said protrusions and/or depressions of said second set are alternately located on first and second circumferences of said second lens.

9. A compound lens according to claim 4, in which said protrusions are formed by elongated projections and said depressions are formed by elongated grooves having a size and shape which are substantially the same as the size and shape of the projections with which they mate, said projections and grooves having respective undercut areas, and at least one of said projections and grooves being formed of an elastically deformable material.

10. A compound lens of claim 9, in which said projections and grooves are formed in the radial directions of said first and second lenses.

11. A compound lens according to claim 9, in which said projections and grooves are formed in the circumferential direction of said first and second lenses.

12. A compound lens according to claim 4, in which said protrusions and/or depressions have an over-hemisphere shape.

13. A compound lens according to claim 4, in which said protrusions and/or depressions have a trapezoidal shape.

14. A compound lens according to claim 4, in which said protrusions and/or depressions have a T shape.

15. A compound lens according to claim 4, wherein said first and second lenses each include a lens body surrounded by a lens holding portion, and said joint surfaces are defined by front or rear surfaces of said lens holding portions.

16. A compound lens according to claim 4, in which one of said first or second lenses has a connecting portion which projects axially from a lens holding portion which is provided around a lens body thereof, said connecting portion projecting in the direction of the optical axis of said one of said lenses and the joint surface of said one of said lenses is defined by the front end surface of said connecting portion.

17. A compound lens according to claim 4, further including a third lens which has a lens holding portion which is provided around a lens body of said third lens and which is arranged so that said lens holding portion is held between said first and second lenses by the joining force of said mating protrusion and depressions.

18. A compound lens according to claim 4, wherein said first and second sets of protrusions and/or depressions each include both protrusions and depressions and wherein each protrusion of said first set is matingly received in a respective depression of said second set and each protrusion of said second set is matingly received in a respective depression of said first set.

19. A compound lens according to claim 4, wherein said first and second joint surfaces extends around substantially the entire periphery of said first and second lenses, respectively.

20. A compound lens, comprising:
a first lens having a first joint surface, a first set of protrusions and/or depressions being located on said first joint surface;
a second lens having a second and third joint surfaces, second and third set of protrusions and/or depressions being located on said second and third joint surfaces, respectively; and
a third lens having a fourth joint surface, a fourth set of protrusions and/or depressions being located on said fourth joint surface;
said first set of protrusions and/or depressions being matingly connected to said second set of protrusions and/or depressions in such a manner that said first and second lenses are held together by the interaction of said first and second set of protrusions and/or depressions with their respective optical axes being coincident, and said third set of protrusions and/or depressions being matingly connected to said fourth set of protrusions and/or depressions in such a manner that said second and third lenses are held together by the interaction between said second and third sets of protrusions and/or depressions with thier respective optical axes being coincident, whereby said first, second and third lenses form a compound lens.

21. A compound lens according to claim 20, wherein said first and second sets of protrusions and/or depressions each include protrusions and depressions and wherein each protrusion of said first set is matingly received in a respective depression of said second set and each protrusion of said second set is matingly received in a respective depression of said first set.

22. A compound lens according to claim 20, wherein said first joint surface extends substantially about the entire periphery of said first lens, said second and third joint surfaces extending around substantially the entire periphery of second lens, and said fourth joint surface extends around substantially about the entire periphery of said third lens.

23. A lens holding device, comprising:
(A) a compound lens including:
(1) a first lens having a first joint surface, a first set of protrusions and/or depressions being located on said first joint surface;
(2) a second lens having a second and third joint surfaces, second and third sets of protrusions and/or depressions being located on said second and third joint surfaces, respectively; and
a third lens having a fourth joint surface, a fourth set of protrusions and/or depressions being located on said fourth joint surface; said first set of protrusions and/or depressions being matingly connected to said second set of protrusions and/or depressions in such a manner that said first and second lenses are held together by the interaction between said first and second sets of protrusions and/or depressions with their respective optical axes being coincident, said third set of protrusions and/or depressions being matingly connected to said fourth set of protrusions and/or depressions in such a manner that said second and third lenses are held together by the interaction between said third and fourth sets of protrusions and/or depressions with their respective optical axes being coincident, whereby said first, second and third lenses form a compound lens; and (B) a lens barrel having a fifth set of protrusions and/or depressions being located thereon, said fifth set of protrusions and/or depressions being matingly connected to a sixth set of protrusions and/or depressions located on said compound lens so as to secure said compound lens to said lens barrel.

24. A lens holding device according to claim 23, wherein said first joint surface extends about substantially about the entire periphery of said first lens, said second and third joint surfaces extend around substantially the entire periphery of second lens, and said fourth joint surface extends around substantially about the entire periphery of said third lens.

* * * * *